United States Patent
Keenan, Jr. et al.

(10) Patent No.: US 11,593,747 B2
(45) Date of Patent: Feb. 28, 2023

(54) AUTOMATED SORT AREA USING ROBOTS

(71) Applicant: OTIS ELEVATOR COMPANY, Farmington, CT (US)

(72) Inventors: Michael P. Keenan, Jr., Suffield, CT (US); Nicholas Cope, Brooklyn, NY (US); Brian O'Connell, Philadelphia, PA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 10 days.

(21) Appl. No.: 16/819,267

(22) Filed: Mar. 16, 2020

(65) Prior Publication Data

US 2021/0287164 A1    Sep. 16, 2021

(51) Int. Cl.
| | |
|---|---|
| G06Q 10/08 | (2012.01) |
| B25J 9/16 | (2006.01) |
| B25J 11/00 | (2006.01) |
| B66B 1/46 | (2006.01) |
| G06Q 10/0832 | (2023.01) |

(Continued)

(52) U.S. Cl.
CPC ........ G06Q 10/0832 (2013.01); B25J 9/1679 (2013.01); B25J 11/008 (2013.01); B66B 1/468 (2013.01); G06Q 10/0833 (2013.01); G06Q 10/0835 (2013.01); B66B 2201/215 (2013.01); B66B 2201/4638 (2013.01); B66B 2201/4653 (2013.01)

(58) Field of Classification Search
CPC ........... G06Q 10/0832; G06Q 10/0833; G06Q 10/0835; G06Q 10/083; B25J 9/1679; B25J 11/008; B66B 1/468; B66B 2201/215; B66B 2201/4638; B66B 2201/4653

See application file for complete search history.

(56) References Cited

U.S. PATENT DOCUMENTS 9,489,490 B1 *  11/2016  Theobald ................. B25J 5/007
9,741,010 B1 *   8/2017  Heinla ................. G06Q 10/083
(Continued)

FOREIGN PATENT DOCUMENTS

| CN | 1795461 A | 6/2006 |
|---|---|---|
| CN | 108163653 A | 6/2018 |

(Continued)

OTHER PUBLICATIONS

Whitman, Julian, "Robots That Ride The Elevator," Apr. 11, 2017, sciencenonfiction.org, pp. 1-4, retrieved from https://sciencenonfiction.org/2017/04/11/robots-that-ride-the-elevator/ (Year: 2017).*

(Continued)

Primary Examiner — Rupangini Singh
Assistant Examiner — Bryan J Kirk
(74) Attorney, Agent, or Firm — Cantor Colburn LLP

(57) ABSTRACT

A method of delivering packages using a robot delivery system including: obtaining information about a package from an online ordering platform application programing interface, the information about the package including at least a destination of the package; transmitting the information about the package to a first robot; instructing the first robot to obtain the package or retain the package; and instructing the first robot to deliver the package to the destination using a conveyance system.

20 Claims, 3 Drawing Sheets

(51) Int. Cl.
*G06Q 10/0833* (2023.01)
*G06Q 10/0835* (2023.01)

(56) References Cited

U.S. PATENT DOCUMENTS

| | | | |
|---|---|---|---|
| 2012/0041593 A1* | 2/2012 | Ichinose | B66B 1/2458 |
| | | | 700/258 |
| 2016/0266578 A1* | 9/2016 | Douglas | G05D 1/0282 |
| 2016/0379282 A1* | 12/2016 | Hill | G06Q 30/0601 |
| | | | 705/26.1 |
| 2017/0364074 A1* | 12/2017 | Lau | G06Q 10/08355 |
| 2018/0107223 A1* | 4/2018 | Zhong | G05D 1/0212 |
| 2018/0330323 A1 | 11/2018 | Trew et al. | |
| 2019/0102730 A1* | 4/2019 | Giorgi | H04L 67/12 |
| 2019/0113935 A1* | 4/2019 | Kuo | G06Q 10/083 |
| 2019/0130349 A1* | 5/2019 | Ferguson | G06Q 10/08355 |
| 2019/0205797 A1* | 7/2019 | Sakurada | G07C 9/00571 |
| 2019/0205857 A1* | 7/2019 | Bell | G06Q 20/02 |
| 2019/0377349 A1* | 12/2019 | van der Merwe | G06Q 50/12 |
| 2020/0090121 A1* | 3/2020 | Gupta | G06Q 50/28 |
| 2020/0183414 A1* | 6/2020 | Shih | B60R 25/01 |

FOREIGN PATENT DOCUMENTS

| | | |
|---|---|---|
| CN | 109034700 A | 12/2018 |
| CN | 109164813 A | 1/2019 |
| CN | 109205406 A | 1/2019 |
| CN | 109250593 A | 1/2019 |
| CN | 110203783 A | 9/2019 |
| CN | 110488836 A | 11/2019 |
| CN | 110498306 A | 11/2019 |
| CN | 110689298 A | 1/2020 |
| JP | 2019142609 A | 8/2019 |
| WO | 2013119942 A1 | 8/2013 |

OTHER PUBLICATIONS

The Extended European Search Report for Application No. 20215772.3-1017; Report dated May 26, 2021; 7 pages.
China Office Action for China Application No. 202011394275.X; dated Sep. 23, 2022; 9 pages.

* cited by examiner

AUTOMATED SORT AREA USING ROBOTS

BACKGROUND

The subject matter disclosed herein relates generally to the field of conveyance systems, and specifically to a method and apparatus for a connecting robot, a conveyance system, and an application programming interfaces for package delivery.

Conveyance systems such as, for example, elevator systems, escalator systems, and moving walkways are typically only configured to interact with human beings alone. Additionally, information passed through application programming interfaces for package delivery are typically only utilized by humans from package delivery services.

BRIEF SUMMARY

According to an embodiment, a method of delivering packages using a robot delivery system is provided. The method including: obtaining information about a package from an online ordering platform application programing interface, the information about the package including at least a destination of the package; transmitting the information about the package to a first robot; instructing the first robot to obtain the package or retain the package; and instructing the first robot to deliver the package to the destination using a conveyance system.

In addition to one or more of the features described herein, or as an alternative, further embodiments may include: transmitting a first elevator call for a first elevator system of a first elevator bank to transport the first robot from a landing where the robot is located to a landing where the destination is located.

In addition to one or more of the features described herein, or as an alternative, further embodiments may include: determining that the first elevator system can accommodate the first elevator call; and instructing a first elevator car of the first elevator system to move to the landing where the robot is located.

In addition to one or more of the features described herein, or as an alternative, further embodiments may include: instructing the first robot to move to the first elevator bank; and instructing the first robot to enter the first elevator car.

In addition to one or more of the features described herein, or as an alternative, further embodiments may include: detecting when the first robot is located within the first elevator car; and instructing the first elevator car to move to the landing where the destination is located.

In addition to one or more of the features described herein, or as an alternative, further embodiments may include: determining that the first elevator system cannot accommodate the first elevator call; transferring the first elevator call to a second elevator system; determining that the second elevator system can accommodate the first elevator call; and instructing the first robot to move to the second elevator system.

In addition to one or more of the features described herein, or as an alternative, further embodiments may include: determining that the first elevator system cannot accommodate the first elevator call; and instructing the first robot to move to the landing where the destination is located via stairs or an escalator.

In addition to one or more of the features described herein, or as an alternative, further embodiments may include: determining an amount of traffic in the first elevator system; and determining that the first elevator system cannot accommodate the first elevator call in response to the amount of traffic.

In addition to one or more of the features described herein, or as an alternative, further embodiments may include: identifying a storage location of the package within a sorting area of a building; and instructing the first robot to obtain the package from the storage location within the sorting area.

In addition to one or more of the features described herein, or as an alternative, further embodiments may include: instructing a second robot to accept the package being delivered to the building; and instructing the second robot to deliver the package to the sorting area.

In addition to one or more of the features described herein, or as an alternative, further embodiments may include: transmitting a confirmation of delivery to the online ordering platform application programing interface when the second robot accepts the package.

In addition to one or more of the features described herein, or as an alternative, further embodiments may include: determining that the storage location is open within the sorting area; and instructing the second robot to place the package in the storage location.

In addition to one or more of the features described herein, or as an alternative, further embodiments may include: identifying a storage location of the package within a sorting area of a building, wherein the storage location is an automated locker; transmitting access information to the first robot to unlock the automated locker; and instructing the first robot to obtain the package from the automated locker using the access information.

In addition to one or more of the features described herein, or as an alternative, further embodiments may include: reading a shipping label the package using a camera of the first robot.

In addition to one or more of the features described herein, or as an alternative, further embodiments may include: determining a weight of the package using a load carrying mechanism of the first robot.

In addition to one or more of the features described herein, or as an alternative, further embodiments may include: obtaining information about the package by connecting to an online ordering platform application programing interface.

In addition to one or more of the features described herein, or as an alternative, further embodiments may include: receiving a notification from an online ordering platform application programing interface that the package will be delivered to a building; instructing a second robot to accept the package being delivered to the building; and instructing the second robot to deliver the package to a sorting area of the building.

In addition to one or more of the features described herein, or as an alternative, further embodiments may include: receiving a request from an individual to adjust at least one of the destination and a time for the first robot to deliver the package to the destination; and instructing the first robot to deliver the package in accordance with the request from the individual to adjust at least one of the destination and a time for the first robot to deliver the package to the destination.

In addition to one or more of the features described herein, or as an alternative, further embodiments may include: obtaining a weight of the package; determining an elevator system to transport the first robot and the package to the destination; and adjusting a maintenance schedule of the elevator system in response to the weight of the package.

According to another embodiment, a computer program product embodied on a non-transitory computer readable medium is provided. The computer program product including instructions that, when executed by a processor, cause the processor to perform operations including: obtaining information about a package from an online ordering platform application programing interface, the information about the package including at least a destination of the package; transmitting the information about the package to a first robot; instructing the first robot to obtain the package or retain the package; and instructing the first robot to deliver the package to the destination using a conveyance system.

Technical effects of embodiments of the present disclosure include interconnecting a robot, application programming interfaces, and conveyance system to complete package deliveries.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
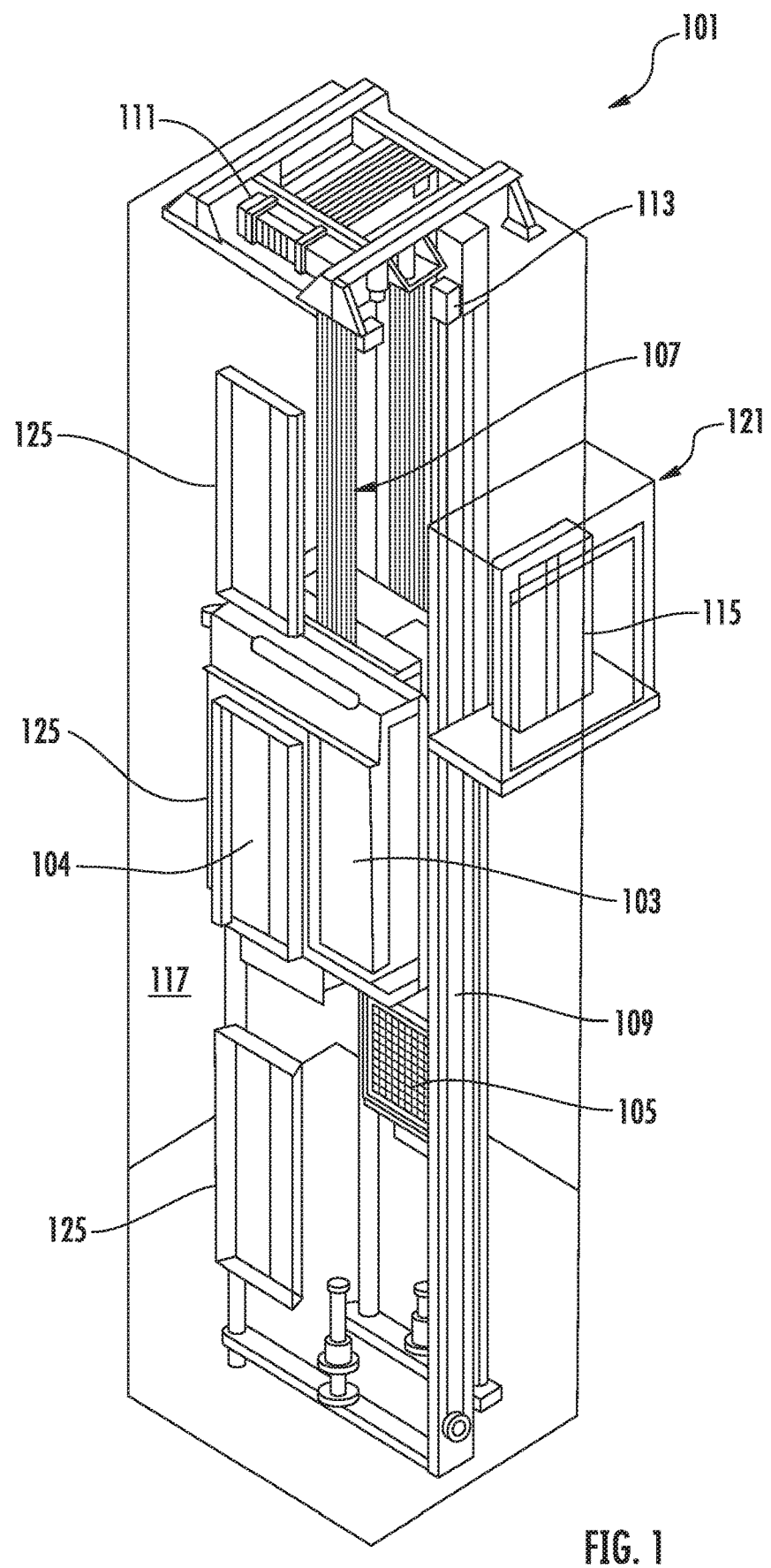
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103 and/or the elevator door 104 may be located on a landing 125 of the elevator system 101. Embodiments disclosed herein may be applicable to both an elevator door 104 integrally attached to the elevator car 103 and/or an elevator door 104 located on a landing 125 of the elevator system 101. The elevator door 104 opens to allow passengers to enter and exit the elevator car 103.

Figure 2:
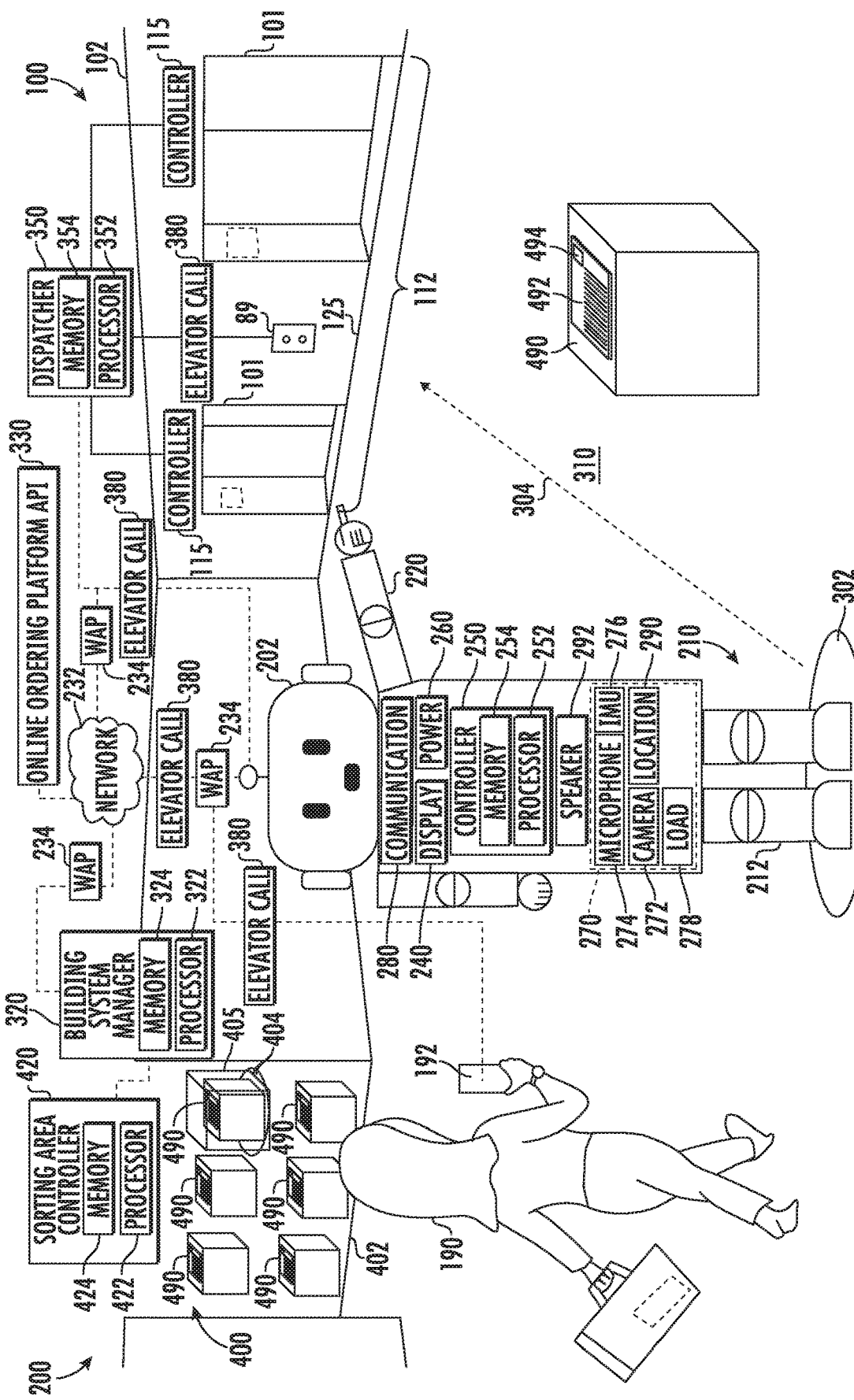
FIG. 2 illustrates a schematic view of a robot delivery system used to assist individuals, in accordance with an embodiment of the disclosure.

Referring now to FIG. 2, with continued reference to FIG. 1, a robot delivery system 200 is illustrated, in accordance with an embodiment of the present disclosure. It should be appreciated that, although particular systems are separately defined in the schematic block diagrams, each or any of the systems may be otherwise combined or separated via hardware and/or software. The robot delivery system 200 comprises and/or is in wireless communication with a robot 202. It is understood that one robot 202 is illustrated, the embodiments disclosed herein may be applicable to robot delivery system 200 having one or more robots 202. The robot 202 may desire to utilize an elevator system 101 and the robot delivery system 200 may coordinate use of the elevator system 101 by robots 202 and individuals 190. It is understood that one robot 202 is illustrated, the embodiments disclosed herein may be applicable to a robot delivery system 200 having one or more robots 202.

It is understood that while elevator systems 101 are utilized for exemplary illustration, embodiments disclosed herein may be applied to other conveyance systems utilizing conveyance apparatuses for transportation such as, for example, escalators, moving walkways, etc.

As illustrated in FIG. 2, a building elevator system 100 within a building 102 may include multiple different individual elevator systems 101 organized in an elevator bank 112. The elevator systems 101 each include an elevator car 103 (not shown in FIG. 2 for simplicity). It is understood that while two elevator systems 101 are utilized for exemplary illustration, embodiments disclosed herein may be applied to building elevator systems 100 having one or more elevator systems 101. Further, the elevator systems 101 illustrated in FIG. 2 are organized into an elevator bank 112 for ease of explanation but it is understood that the elevator systems 101 may be organized into one or more elevator banks 112. Each of the elevator banks 112 may contain one or more elevator systems 101. Each of the elevator banks 112 may also be located on different landings 125.

The landing 125 in the building 102 of FIG. 2 may have an elevator call device 89 located proximate the elevator systems 101. The elevator call device 89 transmits an elevator call 380 to a dispatcher 350 of the building elevator system 100. It should be appreciated that, although the dispatcher is separately defined in the schematic block diagrams, the dispatcher 350 may be combined via hardware and/or software in any controller 115 or other device. The elevator call 380 may include the source of the elevator call 380. The elevator call device 89 may include a destination entry option that includes the destination of the elevator call 380. The elevator call device 89 may be a push button and/or a touch screen and may be activated manually or automatically. For example, the elevator call 380 may be sent by an individual 190 or a robot 202 entering the elevator call 380 via the elevator call device 89. As illustrated in FIG. 2, the robot 202 may utilize a communication module 280 to communicate either directly to the building elevator system 100 and indirectly with the building elevator system 100 through a computing network 232.

A mobile device 192 may also be configured to transmit an elevator call 380. The robot 202 or the individual 190 may be in possession of the mobile device 192 to transmit the elevator call 380. The mobile device 192 may be a smart phone, smart watch, laptop, or any other mobile device known to one of skill in the art. The mobile device 192 be configured to transmit the elevator call 380 through computing network 232 to the dispatcher 350. The mobile device 192 may communicate to the computer network 232 through a wireless access protocol device (WAP) 234 using short-range wireless protocols. Short-range wireless protocols may include, but are not limited to, Bluetooth, Wi-Fi, HaLow (801.11ah), zWave, ZigBee, or Wireless M-Bus. Alternatively, the mobile device 192 may communicate directly with the computer network 232 using long-range wireless protocols. Long-range wireless protocols may include, but are not limited to, cellular, LTE (NB-IoT, CAT M1), LoRa, satellite, Ingenu, or SigFox.

The controllers 115 can be combined, local, remote, cloud, etc. The dispatcher 350 may be local, remote, cloud, etc. The dispatcher 350 is in communication with the controller 115 of each elevator system 101. Alternatively, there may be a single controller that is common to all of the elevator systems 101 and controls all of the elevator system 101, rather than two separate controllers 115, as illustrated in FIG. 2. The dispatcher 350 may be a 'group' software that is configured to select the best elevator car 103 to be assigned to the elevator call 380. The dispatcher 350 manages the elevator call devices 89 related to the elevator bank 112.

The dispatcher 350 is configured to control and coordinate operation of multiple elevator systems 101. The dispatcher 350 may be an electronic controller including a processor 352 and an associated memory 354 comprising computer-executable instructions that, when executed by the processor 352, cause the processor 352 to perform various operations. The processor 352 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 354 may be but is not limited to a random access memory (RAM), read only memory (ROM), or other electronic, optical, magnetic or any other computer readable medium.

The dispatcher 350 is in communication with the elevator call devices 89 of the building elevator system 100. The dispatcher 350 is configured to receive the elevator call 380 transmitted from the elevator call device 89, the mobile device 192, and/or the robot 202. The dispatcher 350 is configured to manage the elevators calls 380 coming in from the elevator call device 89, mobile devices 192, and/or the robot 202 then command one or more elevator systems 101 to respond to elevator call 380. The mobile device 192 may include a mobile computing application configured to allow the individual 190 to transmit an elevator call 380. This mobile computing application may additionally allow the individual 190 to communicate with a sorting area controller 420 to identify when and/or where the individual 190 would like to have a package 490 delivered.

The robot 202 may be configured to operate fully autonomously using a controller 250 to control operation of the robot 202. The controller 250 may be an electronic controller that includes a processor 252 and an associated memory 254 including computer-executable instructions that, when executed by the processor 252, cause the processor 252 to perform various operations. The processor 252 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be a storage device such as, for example, a random access memory (RAM), read only memory (ROM), or other electronic, optical, magnetic or any other computer readable medium.

The robot 202 includes a power source 260 configured to power the robot 202. The power source 260 may include an energy harvesting device and/or an energy storage device. In an embodiment, the energy storage device may be an onboard battery system. The battery system may include but is not limited to a lithium ion battery system. The robot 202 may be configured to move to an external power source (e.g., electrical outlet) to recharge the power source 260.

The robot 202 includes an speaker 292 configured to communicate audible words, music, and/or sounds to individuals 190 located proximate the robot 202. The robot 202 also includes a display device 240 configured to display information visually to individuals 190 located proximate the robot 202. For example, the display device 240 may be a flat screen monitor, a computer tablet, or smart phone device. In an embodiment, the display device 240 may be located on the head of the robot 202 or may replace the head of the robot 202. In an embodiment, the display device 240 a computer tablet or similar display device that is carried by the robot 202. This display device 240 may illustrate package information and may provide a means for authentication of package delivery, including, but not limited to, SMS text messaging, QR codes, or designated PIN numbers.

The robot 202 may be stationed (i.e., located) permanently or temporarily within an elevator lobby 310 that is located on the landing 125 proximate the elevator system 101. The robot 202 could also be located permanently or temporarily within a sorting area 400. The robot 202 may include a propulsion system 210 to move the robot 202. The robot 202 may move throughout the elevator lobby 310, move away from the elevator lobby 310 throughout the landing 125, and/or may move to other landings via the elevator system 101 and/or a stair case (not shown). The propulsion system 210 may be a leg system, as illustrated in FIG. 2, that simulates human legs. As illustrated in FIG. 2, the propulsion system 210 may include two or more legs 212, which are used to move the robot 202. It is understood that while the leg system is utilized for exemplary illustration, embodiments disclosed herein may be applied to robots having other propulsion systems for transportation such as, for example, a wheel system, a rotorcraft system, a hovercraft system, a tread system, or any propulsion system may be known of skill in the art may be utilized. It is also understood that a robot 202 having a humanoid appearance is utilized for exemplary illustration, embodiments disclosed herein may be applied to robots that do not have a humanoid appearance.

The robot 202 includes a sensor system 270 to collect sensor data. The sensor system 270 may include, but is not limited, to an inertial measurement unit (IMU) sensor 276, a camera 272, a microphone 274, a location sensor system 290, and a load detection system 278. The IMU sensor 276 is configured to detect accelerations of the robot 202. The IMU sensor 276 may be a sensor such as, for example, an accelerometer, a gyroscope, or a similar sensor known to one of skill in the art. The IMU sensor 276 may detect accelerations as well as derivatives or integrals of accelerations, such as, for example, velocity, jerk, jounce, snap . . . etc.

The camera 272 may be configured to capture images of areas surrounding the robot 202. The camera 272 may be a still image camera, a video camera, infrared camera, depth sensor, thermal camera, and/or any other type of imaging device known to one of skill in the art. In one embodiment, the controller 250 may be configured to analyze the images captured by the camera 272 using image recognition to identify an individual 190. In another embodiment, the controller 250 may be configured to transmit the images as raw data for processing by the building system manager 320. The image recognition may identify the individual 190 using facial recognition. The image recognition may also be utilized to recognize packages 490 and read shipping labels 492. The shipping label 492 may display information about the package 490. This information may include identifying a source of the package 490, a destination of the package 490, a weight of the package 490, whether the package 490 contains hazardous material, whether the package 490 needs to be refrigerated, a size of the package 490, and/or a weight of the package 490. The information may be displayed on the shipping label 492 using text, a barcode, a QR code, or similar method known to one of skill in the art. For example, the shipping label 492 or package 490 may also include a radio-frequency identification (RFID) tag 494 or any other communication device that is capable of being detected by the communication device 280 of the robot 202 and information about the package 490 may be conveyed to the robot 202 via the RFID tag 494.

The microphone 274 is configured to detect sound. The microphone 274 is configured to detect audible sound proximate the robot 202, such as, for example, language spoken by an individual 190 proximate the robot 202. In one embodiment, the controller 250 may be configured to analyze the sound captured by the microphone 274 using language recognition software and respond accordingly. In another embodiment, the controller 250 may be configured to transmit the sound as raw data for processing by the building system manager 320. The sound (i.e., voice) from an individual 190 may be analyzed to identify the individual 190 using voice recognition.

In one embodiment, the controller 250 may be configured to analyze the sound captured by the microphone 274 using voice recognition to identify an individual 190. In another embodiment, the controller 250 may be configured to transmit the sound as raw data for processing by the building system manager 320 for voice recognition. In one embodiment, the controller 250 may be configured to analyze the sound captured by the microphone 274 using speech recognition to identify what the individuals 190 may be saying. In another embodiment, the controller 250 may be configured to transmit the sound as raw data for processing by the building system manager 320 for speech recognition. For example, the individual 190 may bring a package 490 to a robot 202 and ask to robot 202 to take the package 490 to a destination. The individual 190 may ask the robot 202 to hand deliver the package 490 to the destination itself or deliver the package 490 to a mail delivery service (e.g., the United States Postal Service) to deliver the package 490 to the destination. The individual 190 requesting delivery of the package 490 may be identified through visual recognition (e.g., facial recognition), voice recognition, mobile communication such as SMS text message, notification through a designated mobile application, or the robot 202 may request the individual 190 to provide their name or some other identifier such as, for example, a keycard, an RFID card, or a secure pin/number/passcode.

The dispatcher 350 may coordinate one or more robots 202 to all ride together in a single elevator car 103 if the robots 202 are delivering packages to destinations on the same landing 125 or close landings 125. The dispatcher 350 may cancel elevator calls 380 received from robots 202 and/or instruct the robot 202 to wait if the traffic from individuals 190 is high at a given time and/or delivery of the package 490 is not urgent 490. The dispatcher 350 may instruct the robot 202 to take the stairs or an escalator. The dispatcher 350 may instruct the robot 202 to move to another elevator bank if one particular elevator bank is busy.

The robot 202 may utilize a load carrying mechanism 220 to deliver packages 490. In FIG. 2, the load carrying mechanism are arms of the robot 202. It is understood that the arms of the robot 202 are an example and the robot 202 may utilize other load carrying mechanism, such as, for example, a pallet, a crane, a flat bed, secure compartment, or other load carrying mechanism known to one of skill in the art. Additionally, the robot 202 may be utilized to pull or tow an item, such as, for example, a hospital bed or a wheel chair. In other embodiment, the robot 202 may be an autonomous hospital bed or an autonomous wheel chair. In an embodiment, the package 490 may be an individual 190, such as, for example in the case of a hospital bed or wheel chair. Further, the label 492 may be a hospital admission identification wristband.

The load detection system 278 may be configured to detect a weight of the load being carried or pushed by the load carrying mechanism 220. A robot 202 may be directed to certain elevator cars 103 based on the weight detected by the load detection system 278. For example, a robot 202 carrying a package 490 that is excessively heavy may be directed to ride a freight elevator that is configured to handle excess load. Additionally, if the package 490 being carried by two robots 202 exceeds the weight limits of an elevator car 103, the robots 202 may be instructed to ride separately.

Each elevator call 380 transmitted by a robot 202 may include a call code that may indicate the type of elevator call 380 including the package 490 being transported by the robot 202 and/or the urgency of the elevator call 380. In one example, the call code may indicate that the robot 202 is transporting laundry, which may not be considered urgent. In another example, the call code may indicate that the robot 202 is transporting transplant organs, which may be considered urgent. When the dispatcher 350 receives the elevator call 380 the dispatcher 350 will analyze the code and determine its urgency in comparison to other elevator calls 380 received. Elevator calls 380 that are most urgent will be assigned first, while those that are not urgent may be relegated to wait. Call codes may also be included and/or applied to elevator calls 380 received from individuals. In one example, each elevator call 380 transmitted may receive the same call code, meaning that the every elevator call 380 from an individual 190 would be treated with the same priority and a robot 202 that has an urgent call code may take higher priority than the call code of the individuals 190 whereas a robot 202 with a non-urgent call code may take a lower priority than the call code of the individuals 190. In another example, different individuals 190 may be assigned a different call codes based on either a VIP status or based on job roles. Further, an emergency room physicians may have a call code that gives them the highest priorities over other call codes.

The robot 202 also includes a location sensor system 290 configured to detect a location 302 of the robot 202. The location 302 of the robot 202 may also include the location 302 of the robot 202 relative to other objects in order allow the robot 202 to navigate through hallways of a building 102 and prevent the robot 202 from bumping into objects or individuals 190. The location sensing system 290 may use one or a combination or sensing devices including but not limited to GPS, wireless signal triangulation, SONAR, RADAR, LIDAR, image recognition, or any other location detection or collision avoidance system known to one of skill in the art. The location sensor system 290 may utilize GPS in order to detect a location 302 of the robot 202. The location sensor system 290 may utilize triangulation of wireless signals within the building 102 in order to determine a location 302 of the robot 202 within a building 102. For example, the location sensor system 290 may triangulate the position of the robot 202 within a building 102 utilizing received signal strength (e.g., RSSI) of wireless signals from WAPs 234 in known locations throughout the building 102. In order to avoid colliding with objects, the location sensor system 290 may additionally use SONAR, RADAR, LIDAR, or image recognition (Convolutional Neural Networks). Upon initial deployment or a location reset, the robot 202 may perform a learn mode, such that the robot 202 may become familiar with the environment.

The location 302 of the robot 202 may also be communicated to the dispatcher 350. In one example, the location 302 of the robot 202 may be communicated to the dispatcher 350 when the robot 202 desires to use the elevator system 101. By knowing the location 302 of the robot 202, the distance away from the elevator bank 112 (e.g., elevator system 101) along a probable path 304, and the movement speed of the robot 202, then the dispatcher 350 may call an elevator car 103 to arrive at the elevator bank 112 at or before when the robot 202 arrives at the elevator bank 112. Use of the elevator systems 101 may be limited to learnt periods of low traffic of individuals 190.

The robot 202 includes a communication module 280 configured to allow the controller 250 of the robot 202 to communicate with the building system manager 320 and the dispatcher 350. The communication module 280 is capable of transmitting and receiving data to and from the dispatcher 350 through a computer network 232. The computer network 232 may be a cloud computing network. The communication module 280 is capable of transmitting and receiving data to and from the building system manager 320 through the computer network 232. In another embodiment, the communication module 280 is capable of transmitting and receiving data to and from the dispatcher 350 by communicating directly with the dispatcher 350.

The communication module 280 may communicate to the computer network 232 through a wireless access protocol device (WAP) 234 using short-range wireless protocols. Alternatively, the communication module 280 may communicate directly with the computer network 232 using long-range wireless protocols. Alternatively, the communication module 280 may communicate with the dispatcher 350 through the building system manager 320. The communication module 280 may be in direct communication with the building system manager 320 using short-range wireless protocols.

The communication module 280 may communicate to the dispatcher 350 through a WAP 234 using short-range wireless protocols. Alternatively, the communication module 280 may communicate directly with the dispatcher 350 using short-range wireless protocols.

The building system manager 320 may communicate to the computer network 232 through a WAP 234 using short-range wireless protocols. The building system manager 320 may communicate directly with the computer network 232 using long-range wireless protocols.

The building system manager 320 is an electronic controller that includes a processor 322 and an associated memory 324 including computer-executable instructions that, when executed by the processor 322, cause the processor 322 to perform various operations. The processor 322 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 324 may be a storage device such as, for example, a random access memory (RAM), read only memory (ROM), or other electronic, optical, magnetic or any other computer readable medium.

The building system manager 320 may be configured to obtain, store, and provide to the robot 202 information that may be useful to the robot 202. The information may include a directory of the building 102 processor including images of individuals 190 that may be used for facial recognition or voice signatures of individuals 190 that may be used voice recognition of individuals 190. The information may also include directory information of people or locations within the building 102 and/or in the area surrounding the building 102. The building system manager 320 may also include historical data regarding the performance of the elevator system 101 within the building 102 as well as current status and a load of the elevator systems 101. The building system manager 320 may also perform climate control within the building 102 and/or building access control for the building 102.

The robot delivery system 200 may also include a sorting area controller 420 that monitors and controls a sorting area 400. The sorting area controller 420 may be an electronic controller that includes a processor 422 and an associated memory 424 including computer-executable instructions that, when executed by the processor 422, cause the processor 422 to perform various operations. The processor 422 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 424 may be a storage device such as, for example, a random access memory (RAM), read only memory (ROM), or other electronic, optical, magnetic or any other computer readable medium.

The sorting area 400 may be a location, room, loading dock, or any other location inside or outside the building 102 for coordinating delivery of packages 490 to the building and/or shipment of packages 490 outside of the building 102. Packages 490 may be stored within the sorting area 400. Packages 490 may be stored within the sorting area 400 on shelves 402 or in any other manor. The packages 490 may be stored in such a manner that the shipping label 492 may be visible to a camera 272 of the robot 202. Alternatively, if the package include an RFID tag 494 or similar device, the package 490 may not be required to be stored in such a manner so that the shipping label 492 is visible.

The sorting area controller 420 is configured to control or send commands to one or more robots 202 that may be bringing packages 490 into the sorting area 400 or taking packages 490 out of the sorting area 400. The sorting area controller 420 may track each package 490 brought into the sorting area 400 and maintain a database of where each package 490 is located within the sorting area 400. For example, the sorting area controller 420 may maintain a package database in real-time of all the storage locations 404 within the sorting area 400 and may indicate whether the storage location 404 is occupied with a package 490 or not. If the storage location 404 is occupied, then the package database will identify the package 490 that is located in that storage location 404 and the information associated with that package 490, such as, for example, a source of the package 490, a destination of the package 490, a weight of the package 490, whether the package 490 contains hazardous material, whether the package 490 needs to be refrigerated, a size of the package 490, and/or a weight of the package 490. In one example, the storage location 404 may be identified in the package database by a shelf 402 and a location on that shelf 402. For example, the locations 404 may be bins, automated lockers 405, or locked lockers.

The robot 202 may also be programmed to autonomously interact with automated lockers 405 that leverages information about the package 490 created by a package delivery service and transmitted to the sorting area controller 420 through an online ordering platform API 330. The robot 202 may be provided with access information to open the automated locker 405 from the sorting area controller 420. The access information may be a credential, a key code, a pin, a password, or any similar type of access information known to one of skill in the art. The information about the package 490 may include potential contents, sender, and recipients, which allows the sorting area controller to place designated packages 490 with specific robots 202 and appropriately dispatch the correct robot 202. The sorting area controller 420 acts as a robot fleet management system.

The sorting area controller 420 may be in communication with an online ordering platform application programing interface (API) 330 through the computing network 232. The online platform API 330 may be a website where the package 490 was ordered from or for the delivery service contracted to deliver the package 490. Advantageously, by being in communication with the online platform API 330, the sorting area controller 420 can predict arrival of a package 490, assign a storage location 404 to the package 490 in advance of arrival of the package 490, and adjust availability of a robot 202 for receipt and/or delivery of the package 490. Also advantageously, by being in communication with the online platform API 330, the sorting area controller 420 can predict arrival of a package 490 and determine whether additional individuals 190 (i.e., man power), robots 202, or tools (e.g., forklifts) may be needed to receive delivery of the package 490. Once the package 490 is delivered to the building 102 and received by a robot 202, the robot 202 is configured to transmit a confirmation of delivery back to the online platform API 330. The confirmation may include a time of delivery and a signature for delivery. The online ordering platform 330 may then be able to notify the individual 190 that is expecting the package 490 that the package 490 has been received at the sorting area 400. Further, once the robot 202 removes a package 490 from the sorting area 400 for delivery to the destination of the package 490, the robot 202 may be configured to transmit a notice back to the online platform API 330 that the package 490 is out for delivery to the destination of the package 490. The online ordering platform 330 may then be able to notify the individual 190 that is expecting the package 490 that the package 490 is out for delivery to the destination of the package 490.

The online ordering platform 330 may also be queried by the robot 202 of the sorting area controller 420 to obtain more information about the package 490, such as, for example, a source of the package 490, a destination of the package 490, a weight of the package 490, whether the package 490 contains hazardous material, whether the package 490 needs to be refrigerated, a size of the package 490, and/or a weight of the package 490. Alternatively, the size and/or weight of the package 490 may be determined using tools (e.g., scales) in the sorting area 400 or using the robot 202. For example, the load detection system 278 may be utilized to determine a weight of the package 490. Additionally, the load carrying mechanism 220 and/or the camera 272 of the robot 202 may be utilized to determine a size (e.g., dimensions) of a package 490 through tools, such as, for example, image recognition, weight, and capturing point to point measurements through sensing with its robotic arms.

Before, after, and during the delivery of the package 490 from the sorting area 400 to the destination of the package 490 continuous real-time communication may be maintained between robot 202, the sorting area controller 420, the building system manager 320, and the dispatcher 350. Advantageously, this continuous real-time communication allows the robot 202 to be continuously tracked throughout the delivery process, such that utilization of the robots 202 is maximized, elevator cars 103 may be called in advance of the arrival of the robot 202 to the elevator bank 112, high traffic times or elevator systems 101 with high traffic may be avoided to reduce wait times for individuals 190, the delivery of packages 490 with hazardous material can be closely monitored, a prediction may be made when the packages 490 should arrive at the destination, and an overall reduction in delivery time of packages 490 to individuals 190. Additionally, knowing the weight of each package 490 to be delivered may allow data to be predicted regarding wear and tear on the elevator car 103 and maintenance schedules may be adjusted accordingly Referring now to FIG. 3, with continued reference to FIGS. 1-2, a flow chart of method 500 of delivering packages 290 using the robot delivery system 200 of FIG. 2, is illustrated, in accordance with an embodiment of the disclosure.

At block 504, information about a package 490 is obtained from an online ordering platform API 330. The information about the package may comprises at least a destination of the package 490.

At block 506, the information about the package 490 is transmitting to a first robot 202.

At block 508, the first robot 202 is instructed to obtain the package 508 or retain the package 508 (if already obtained). A storage location 404 of the package 490 within a sorting area 400 of a building 102 may be identified and the first robot 202 may be instructed to obtain the package 490 from the storage location 404 within the sorting area 400. In an embodiment, the storage location 404 may be an automated locker 405 and the sorting area controller 420 may transmit access information to unlock the automated locker 405. The access information may be a credential, a key code, a pin, a password, or any similar type of access information known to one of skill in the art. The first robot 202 may be instructed to obtain the package 490 from the automated locker 405 using the access information.

At block 510, the first robot 202 is instructed to deliver the package 490 to the destination using a conveyance system. In order to get to the destination, the robot 202 may need to travel to another landing 125, thus the robot 202 be required to use an elevator system 101. The method may comprise transmitting a first elevator call 380 for a first elevator system 101 of a first elevator bank 112 to transport the robot 202 from a landing 125 where the robot 202 is located to a landing 125 where the destination is located.

Once received by the dispatcher 350 it may be determined that the first elevator system 101 can accommodate the first elevator call 380 and then a first elevator car 103 of the first elevator system 101 is instructed to move to the landing 125 where the robot 202 is located. The first robot 202 is instructed to move to the first elevator bank 112 to enter the first elevator car 103 when the first elevator car 103 arrives at the landing 125 where the robot 202 is located. Once the first robot 202 is detected as being located within the first elevator car 103, then the first elevator car 103 may be instructed to move to the landing 125 where the destination is located.

Once received by the dispatcher 350 it may be determined that the first elevator system 101 cannot accommodate the first elevator call 380 and then the first elevator call 380 may be transferred to the second elevator system 101. It may be determined that the second elevator system 101 can accommodate the first elevator call 380 and then the first robot 202 may be instructed to move to the second elevator system 101. The second elevator system 101 may be at the same or different elevator bank as the first elevator system 101. Alternatively, it may be determined that the first elevator system 101 cannot accommodate the first elevator call 380 and then the first robot 202 is instructed to move to the landing 125 where the destination is located via stairs or an escalator. It may be determined that the first elevator system 101 cannot accommodate the first elevator call 380 in response to an amount of traffic in the first elevator system 101, which may be predicted or measured in real-time.

Prior to block 504, the method 500 may further comprise that a second robot 202 is instructed to accept the package 490 being delivered to the building 102 and then the second robot 202 may be instructed to deliver the package 490 to the sorting area 400. The robot 202 may transmit confirmation of delivery to an online platform API when the second robot 202 accepts the package 490.

The sorting area controller 420 will have to determine where to place the package 490 when it is delivered to the building 102. Therefore the sorting area controller 420 determines that the storage location 404 is open within the sorting area 400 and instructs the second robot 202 to place the package 490 in the storage location 404.

The method 500 may further comprise: receiving a notification from an online ordering platform API 330 that the package 490 will be delivered to the building 102. Then a second robot 202 may be instructed to accept the package 490 being delivered to the building 102 and to deliver the package 490 to the sorting area 400. The second robot 202 may be the same as the first robot 202.

The method 500 may further comprise that a request is received from an individual 190 to adjust at least one of the destination and a time for the first robot 202 to deliver the package 490 to the destination and then the first robot 202 may be instructed to deliver the package 490 in accordance with the request from the individual 190 to adjust at least one of the destination and a time for the first robot 202 to deliver the package 490 to the destination. The individual 190 may submit this request using the mobile device 192.

The method 500 may additionally comprise that a weight of the package 490 is obtained and once an elevator system 101 to transport the first robot 202 and package 490 to the destination is determined then a maintenance schedule of the elevator system 101 may be adjust in response to the weight of the package 490 to account for the additional wear and tear that will be caused by the delivery of the package 490.

Figure 3:
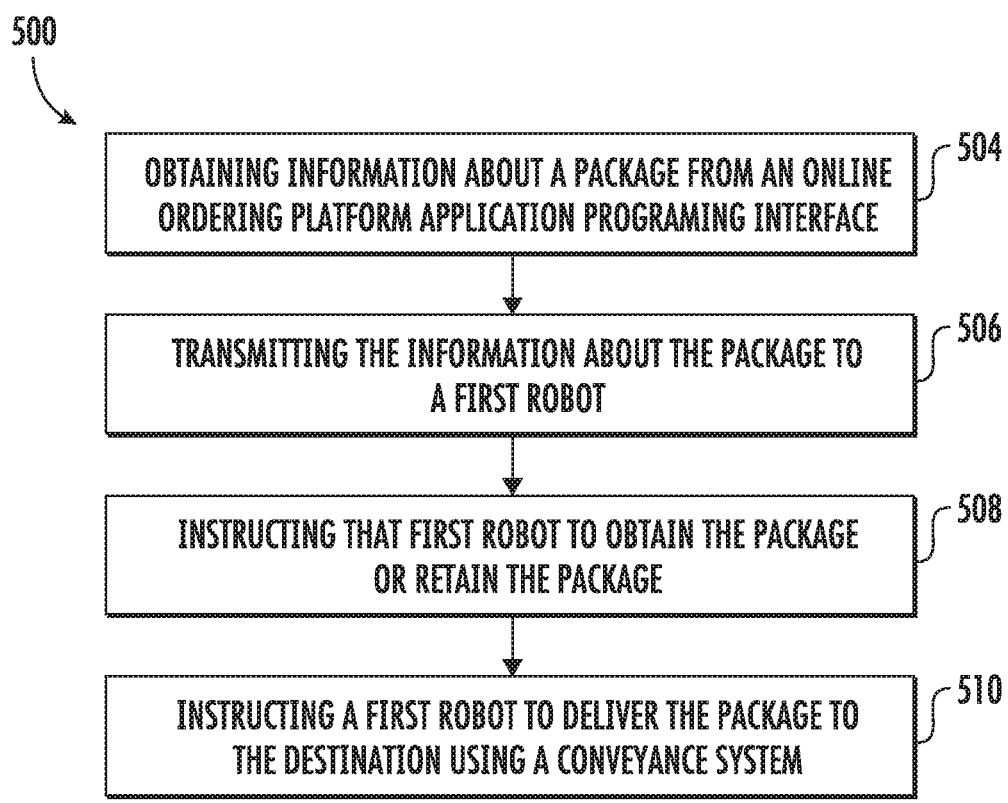
FIG. 3 is a flow chart of method of delivering packages using the robot delivery system of FIG. 2, in accordance with an embodiment of the disclosure.

While the above description has described the flow process of FIG. 3 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of delivering packages using a robot delivery system, the method comprising:
    obtaining, using a sorting area controller, information about a package from an online ordering platform application programing interface, the information about the package comprising at least a destination of the package;
    transmitting the information about the package to a first robot of a plurality of robots through a wireless connection between the sorting area controller and a communication module of the first robot;
    instructing, using the sorting area controller, the first robot to obtain the package or retain the package using a load carrying mechanism of the first robot;
    determining, using the first robot, a call code associated with the package and including an urgency level associated with the package and transmitting the call code including the urgency level to a dispatcher of a first elevator system;
    determining, using the dispatcher, that the first robot will be required to travel to a different floor than a current location of the first robot to deliver the package and determining the urgency level associated with the package from the call code; and
    coordinating, using the dispatcher of the first elevator system, use of the first elevator system by the first robot based on the call code, elevator traffic from the plurality of robots, traffic from human passengers, and the information about the package,
    wherein the dispatcher of the first elevator system will give preference over human users of the first elevator system to the first robot carrying the package when the call code has a high urgency, and
    wherein the dispatcher of the first elevator system will give preference to human users of the first elevator system over the first robot carrying the package when the call code has a low urgency.

2. The method of claim 1, further comprising:
    transmitting a first elevator call for the first elevator system of a first elevator bank to transport the first robot from a landing where the first robot is located to a landing where the destination is located.

3. The method of claim 2, further comprising:
    determining, using the dispatcher of the first elevator system, that the first elevator system can accommodate the first elevator call; and
    instructing a first elevator car of the first elevator system to move to the landing where the first robot is located.

4. The method of claim 3, further comprising:
    instructing the first robot to move to the first elevator bank using a propulsion system of the first robot; and
    instructing the first robot to enter the first elevator car using the propulsion system of the first robot.

5. The method of claim 4, further comprising:
    detecting the first robot is located within the first elevator car, using a location sensor system of the first robot; and
    instructing the first elevator car to move to the landing where the destination is located.

6. The method of claim 2, further comprising:
    determining, using the dispatcher of the first elevator system, that the first elevator system cannot accommodate the first elevator call;
    transferring, using the dispatcher of the first elevator system, the first elevator call to a second elevator system;

determining, using a dispatcher of the second elevator system, that the second elevator system can accommodate the transferred first elevator call; and
instructing the first robot to move to the second elevator system using a propulsion system of the first robot.

7. The method of claim 2, further comprising:
determining, using the dispatcher of the first elevator system, that the first elevator system cannot accommodate the first elevator call; and
instructing, using the sorting area controller, the first robot to move to the landing where the destination is located via stairs or an escalator.

8. The method of claim 2, further comprising:
determining an amount of traffic in the first elevator system based on the elevator traffic from the plurality of robots and the traffic from human passengers; and
determining, using the dispatcher of the first elevator system, that the first elevator system cannot accommodate the first elevator call in response to the amount of traffic.

9. The method of claim 1, further comprising:
identifying, using the sorting area controller, a storage location of the package within a sorting area of a building; and
instructing, using the sorting area controller, the first robot to obtain the package from the storage location within the sorting area.

10. The method of claim 9, further comprising:
instructing, using the sorting area controller, a second robot of the plurality of robots to accept the package being delivered to the building; and
instructing, using the sorting area controller, the second robot to deliver the package to the sorting area.

11. The method of claim 10, further comprising:
transmitting a confirmation of delivery to the online ordering platform application interface when the second robot accepts the package.

12. The method of claim 10, further comprising:
determining that the storage location is available within the sorting area, using the sorting area controller; and
instructing the second robot to place the package in the storage location.

13. The method of claim 1, further comprising:
identifying a storage location of the package within a sorting area of a building using the sorting area controller, wherein the storage location is an automated locker;
transmitting, using the sorting area controller, access information to the first robot to unlock the automated locker; and
instructing, using the sorting area controller, the first robot to obtain the package from the automated locker using the access information.

14. The method of claim 13, further comprising:
reading a shipping label on the package using a camera of the first robot.

15. The method of claim 13, further comprising:
determining a weight of the package using the load carrying mechanism of the first robot.

16. The method of claim 1, wherein the information about the package is obtained from at least one of text or an RFID tag on the package.

17. The method of claim 1, further comprising:
receiving, using the sorting area controller, a notification from the online ordering platform application programing interface that the package will be delivered to a building;
instructing, using the using sorting area controller, a second robot of the plurality of robots to accept the package being delivered to the building; and
instructing, using the using sorting area controller, the second robot to deliver the package to a sorting area of the building.

18. The method of claim 1, further comprising:
receiving a request from an individual through a mobile device to adjust at least one of the destination and a time for the first robot to deliver the package to the destination; and
instructing the first robot to deliver the package in accordance with the request from the individual.

19. The method of claim 1, further comprising:
obtaining a weight of the package;
determining an elevator system to transport the first robot and the package to the destination; and
adjusting a maintenance schedule of the first elevator system in response to the weight of the package.

20. A computer program product tangibly embodied on a non-transitory computer readable medium, the computer program product including instructions that, when executed by a processor, cause the processor to perform operations comprising:
obtaining, using a sorting area controller, information about a package from an online ordering platform application programing interface, the information about the package comprising at least a destination of the package;
transmitting the information about the package to a first robot of a plurality of robots through a wireless connection between the sorting area controller and a communication module of the first robot;
instructing, using the sorting area controller, the first robot to obtain the package or retain the package using a load carrying mechanism of the first robot;
determining, using the first robot, a call code associated with the package and including an urgency level associated with the package and transmitting the call code including the urgency level to a dispatcher of an elevator system;
determining, using the dispatcher of the elevator system, that the first robot will be required to travel to a different floor than a current location of the first robot to deliver the package and determining the urgency level associated with the package from the call code; and
coordinating, using the dispatcher of the first elevator system, use of the first elevator system by the first robot based on the call code, elevator traffic from the plurality of robots, traffic from human passengers, and the information about the package,
wherein the dispatcher of the first elevator system will give preference over human users of the elevator system to the first robot carrying the package when the call code has a high urgency, and
wherein the dispatcher of the first elevator system will give preference to human users of the first elevator system over the first robot carrying the package when the call code has a low urgency.

* * * * *